United States Patent
Ramcharan

(10) Patent No.: US 9,634,972 B1
(45) Date of Patent: Apr. 25, 2017

(54) COMPUTER PROCESS TO NOTIFY ON THE DEATH OF A LOVED ONE

(71) Applicant: Krishna Ramcharan, Toronto (CA)

(72) Inventor: Krishna Ramcharan, Toronto (CA)

( * ) Notice: Subject to any disclaimer, the term of this patent is extended or adjusted under 35 U.S.C. 154(b) by 0 days.

(21) Appl. No.: 14/956,535

(22) Filed: Dec. 2, 2015

(51) Int. Cl.
| | |
|---|---|
| H04L 29/06 | (2006.01) |
| H04L 12/58 | (2006.01) |
| G06Q 10/10 | (2012.01) |
| H04W 12/02 | (2009.01) |
| H04W 8/18 | (2009.01) |
| H04W 4/00 | (2009.01) |
| H04W 4/12 | (2009.01) |
| H04M 1/725 | (2006.01) |

(52) U.S. Cl.
CPC ......... *H04L 51/14* (2013.01); *G06Q 10/109* (2013.01); *H04M 1/72552* (2013.01); *H04M 1/72561* (2013.01); *H04W 4/003* (2013.01); *H04W 4/12* (2013.01); *H04W 8/186* (2013.01); *H04W 12/02* (2013.01)

(58) Field of Classification Search
CPC ...... G06Q 10/107; G06Q 50/01; G06Q 50/10; G06Q 10/06311; H04L 51/14; H04L 67/02; H04L 51/32; H04W 48/10; H04W 4/06; H04W 48/08
USPC .............................................. 455/414.1–417
See application file for complete search history.

(56) References Cited

U.S. PATENT DOCUMENTS

2016/0371797 A1\* 12/2016 Bolyard, Jr. ........... G06Q 50/10

\* cited by examiner

*Primary Examiner* — Ronald Eisner
(74) *Attorney, Agent, or Firm* — Nasser Ashgriz; Uipatent Inc.

(57) ABSTRACT

The web application of this present process sends two text messages to a smartphone when the web page, where information on deaths and available funeral arrangements is initially entered, is closed; then, a third if information on funeral arrangements is updated. Two of the text messages, which provide notification of the death and a link to the web application to display information on the funeral arrangements, are forwarded to all relevant contacts in the smartphone, with the contacts forwarding the text messages to the relevant contacts in their smartphones.

8 Claims, 8 Drawing Sheets

COMPUTER PROCESS TO NOTIFY ON THE DEATH OF A LOVED ONE

BACKGROUND OF THE PROCESS

Field of the Process

This process relates to services utilizing text messages, a web application, smartphones and a combination of desktop computers, laptop computers and tablets to dispense and receive notification on the deaths and information on funeral arrangements of family members, friends or acquaintances, regardless of where they live globally and language spoken, on a timely basis.

Description of Prior Art

Any discussion of the prior art throughout the specification should in no way be considered an admission that such prior art is widely known or forms part of common general knowledge in the field. When someone dies, it is a stressful time for the family. However, information on the death and funeral arrangements must be dispensed by the family or close friends, on a timely basis. Those seeking information on the funeral arrangements on a timely basis and not finding it, will desire it. Those who dispense information on deaths and funeral arrangements using this process will be clients, for whom there is a monetary fee. Those who seek information on deaths and funeral arrangements using this process will be guests and are usually other family members, friends and acquaintances of the deceased for whom the service is free. There is a variety of processes by which information on deaths and funeral arrangements is presently dispensed or sought: By phone. By Facebook. Individual funeral parlors have websites. Obituaries can also be posted in newspapers. The greatest difficulty associated with the above processes is: Even though information is dispensed, clients have no way of ascertaining that guests will receive the information, and if so, on a timely basis as clients seeking information have to search for it. The process of this application overcomes this difficulty by being proactive. There is a very high level of certainty that guests will have the information on deaths and funeral arrangements on a timely basis. When someone dies, news of the death is sent to guests by text messages and thru a link in the text messages, guests will access the web application where information on funeral arrangements is available.

BRIEF SUMMARY OF THE PROCESS

The main objective of the present process is to have a web application into which clients can enter information on the deaths and funeral arrangements on their loved ones.

Another objective of the present process is for the web application to initially generate and send two text messages to the clients' smartphones, after which the clients will forward one of the text message to the relevant contacts in their smartphones, with the guests forwarding the forwarded text message to the relevant contacts in their smartphones.

Another objective of the present process is for each text message to provide a link to the web application, one by which clients will update information on the funeral arrangements of the deceased, another by which guests will obtain information on the funeral arrangements of the deceased.

Another objective of the present process is for the web application to generate and send a text message to the clients' smartphones if information on funeral arrangements is updated, after which the clients will forward the new text message to the relevant contacts in their smartphones, with the guests forwarding the new text messages to the relevant contacts in their smartphones.

Another objective of the present process is to have the web application available in different languages.

Another objective of the present process is for clients to have the option to write the obituary of the deceased in the web application and for guests to have the option to view the obituary.

Another objective of the present process is for guests to have the option to add their names to a condolence page in the web application.

Another objective of the present process is to have clients and guests share memories by posting pictures of their loved ones in the web application.

Another objective of the present process is to video stream the funeral ceremonies so that guests, who may be physically incapable or in another physical location, can participate in the funeral ceremony.

Another objective of the present process is for guests to have the option to chat in a chat room about the deceased in the web application.

Another objective of the present process is for guests to have the option to send flowers with the help of the web application.

Another objective of the present process is for guests to have the option to make a charitable donation with the help of the web application.

DESCRIPTION OF THE DRAWINGS

Referring to the attached drawings which form part of this original disclosure.

DETAILED DESCRIPTION OF THE PROCESS

Figure 1:
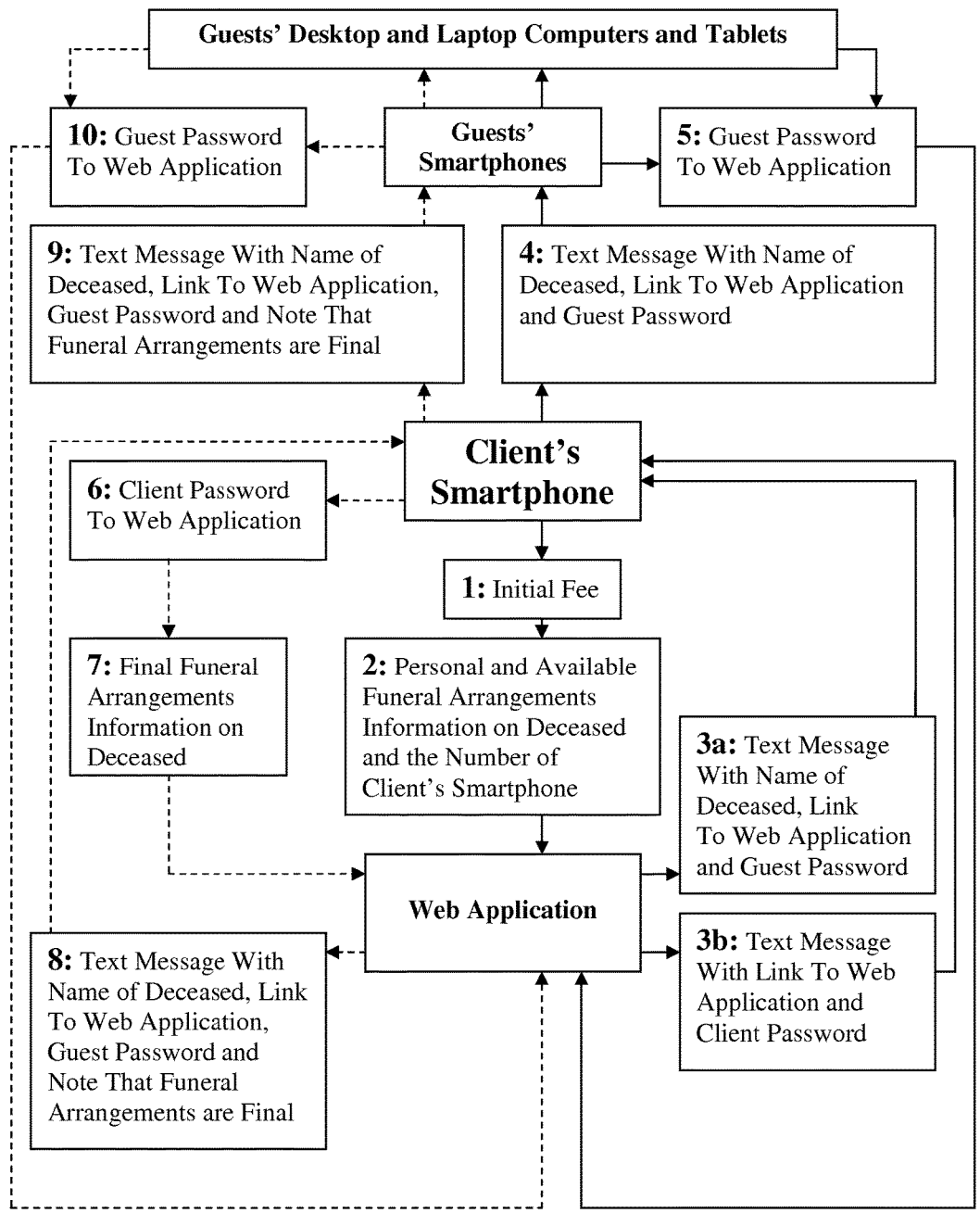
FIG. 1 is a Flowchart of a first version of the process of dispensing and receiving notification by text messages over smartphones about the deaths and information on funeral arrangements of people wherein the client uses a smartphone and the guests, a combination of smartphones, desktop and laptop computers and tablets to access the information.

Referring to FIG. 1, therein is shown a first version of the process comprising of the following actions: 1: Using a smartphone, the client accesses the application and pays a fee. 2: Still using the smartphone, the client then enters personal and available funeral arrangements information on the deceased and the number of the smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. Some of the guests may choose to use the link together with the guest password and their smartphones to access information on funeral arrangements. Other guests may choose to use the address of link together with the guest password and either their desktop or laptop computers or tablets to access information on funeral arrangements. 6: If funeral arrangements were incomplete or have changed, the client uses the link together with the client password and the smartphone to access the application. 7: Information on funeral arrangements is updated using the smartphone. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: Some of the guests may choose to use the link together with the guest password and their smartphones to access information on final funeral arrangements. Other guests may choose to use the address of link together with the guest password and either their desktop or laptop computers or tablets to access information on final funeral arrangements.

Figure 2:
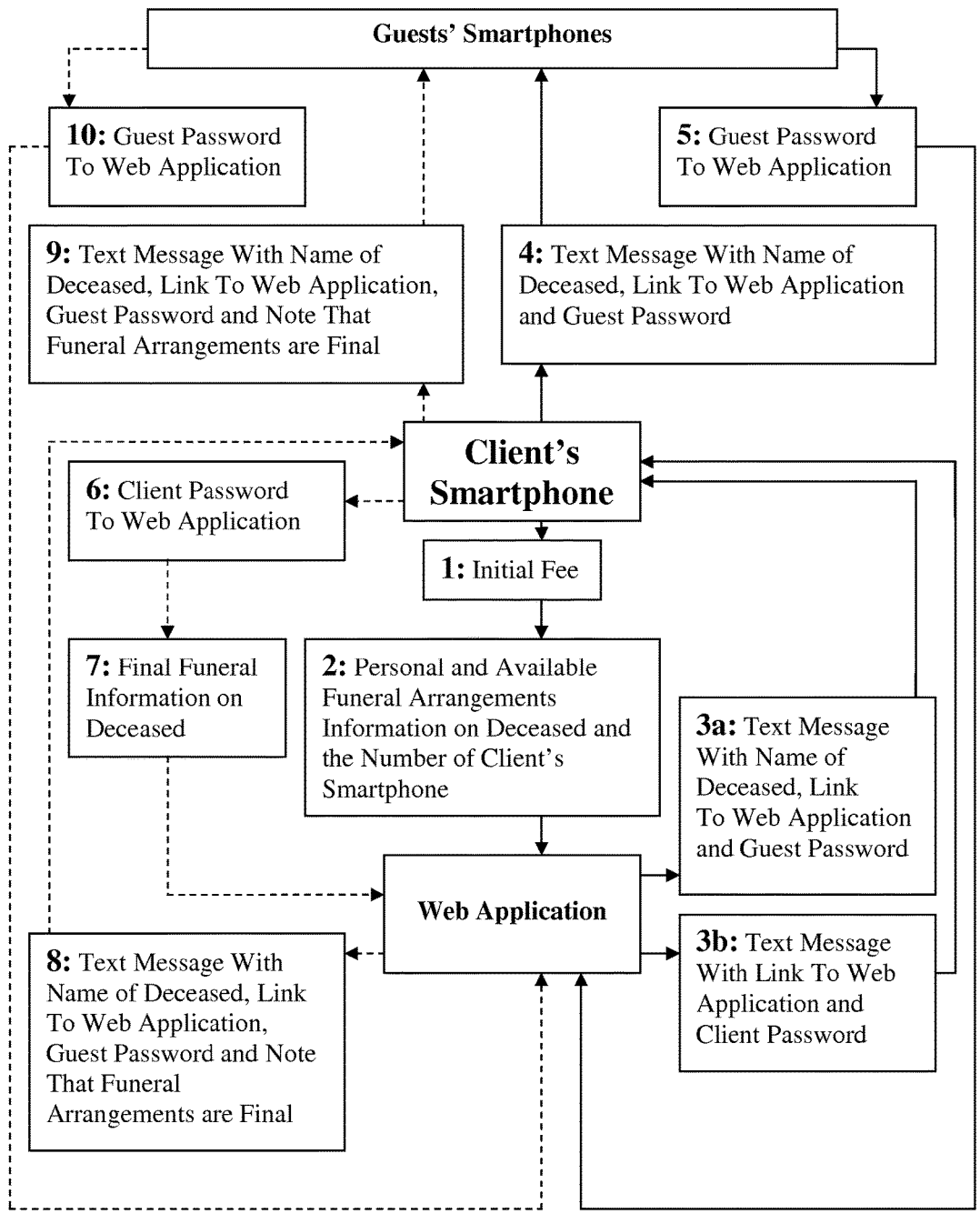
FIG. 2 is a Flowchart of a second version of the process of dispensing and receiving notification by text messages over smartphones about the deaths and information on funeral arrangements of people wherein the client and guests use smartphones to access the information.

Referring to FIG. 2, therein is shown a second version of the process comprising of the following actions: 1: Using a smartphone, the client accesses the application and pays a fee. 2: Still using the smartphone, the client then enters personal and available funeral arrangements information on the deceased and the number of the smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. The guests will use the link together with the guest password and their smartphones to access information on funeral arrangements. 6: If funeral arrangements were incomplete or have changed, the client uses the link together with the client password and the smartphone to access the application. 7: Information on funeral arrangements is updated using the smartphone. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: The guests will use the link together with the guest password and their smartphones to access information on final funeral arrangements.

Figure 3:
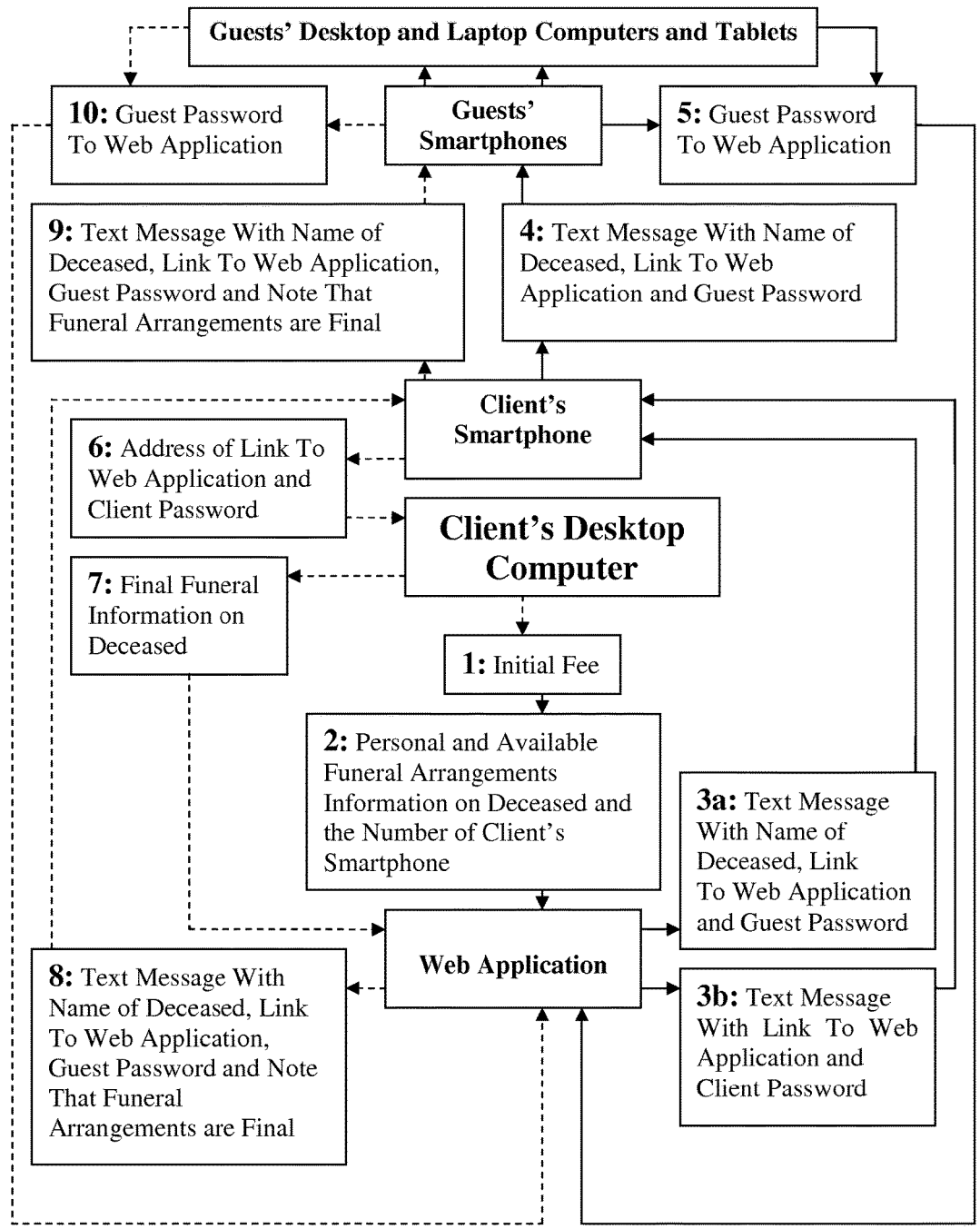
FIG. 3 is a Flowchart of a third version of the process of dispensing and receiving notification by text messages over smartphones about the deaths and information on funeral arrangements of people wherein the client uses a combination of a smartphone and desktop computer and the guests, a combination of smartphones, desktop and laptop computers and tablets to access the information.

Referring to FIG. 3, therein is shown a third version of the process comprising of the following actions: 1: Using a desktop computer, the client accesses the application and pays a fee. 2: Still using the desktop computer, the client then enters personal and available funeral arrangements information on the deceased and the number of a smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. Some of the guests may choose to use the link together with the guest password and their smartphones to access information on funeral arrangements. Other guests may choose to use the address of link together with the guest password and either their desktop or laptop computers or tablets to access information on funeral arrangements. 6: If funeral arrangements were incomplete or have changed, the client uses the address of the link together with the client password and the desktop computer to access the application. 7: Information on funeral arrangements is updated using the desktop computer. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: Some of the guests may choose to use the link together with the guest password and their smartphones to access information on final funeral arrangements. Other guests may choose to use the address of link together with the guest password and either their desktop or laptop computers or tablets to access information on final funeral arrangements.

Figure 4:
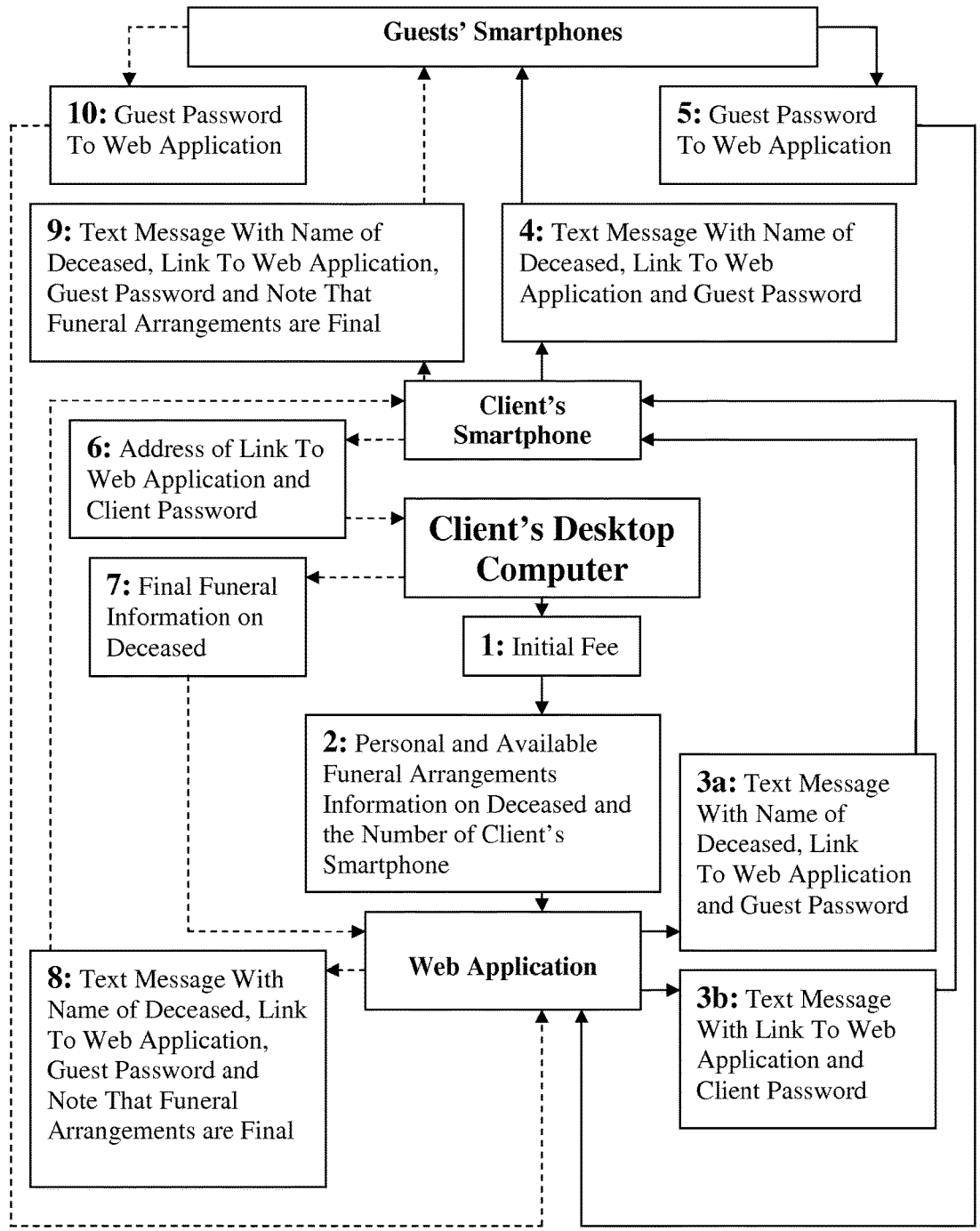
FIG. 4 is a Flowchart of a fourth version of the process of dispensing and receiving notification by text messages over smartphones about the deaths and information on funeral arrangements of people wherein the client uses a combination of a smartphone and desktop computer and the guests, smartphones to access the information.

Referring to FIG. 4, therein is shown a fourth version of the process comprising of the following actions: 1: Using a desktop computer, the client accesses the application and pays a fee. 2: Still using the desktop computer, the client then enters personal and available funeral arrangements information on the deceased and the number of a smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. The guests will use the link together with the guest password and their smartphones to access information on funeral arrangements. 6: If funeral arrangements were incomplete or have changed, the client uses the address of the link together with the client password and the desktop computer to access the application. 7: Information on funeral arrangements is updated using the desktop computer. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: The guests will use the link together with the guest password and their smartphones to access information on final funeral arrangements.

Figure 5:
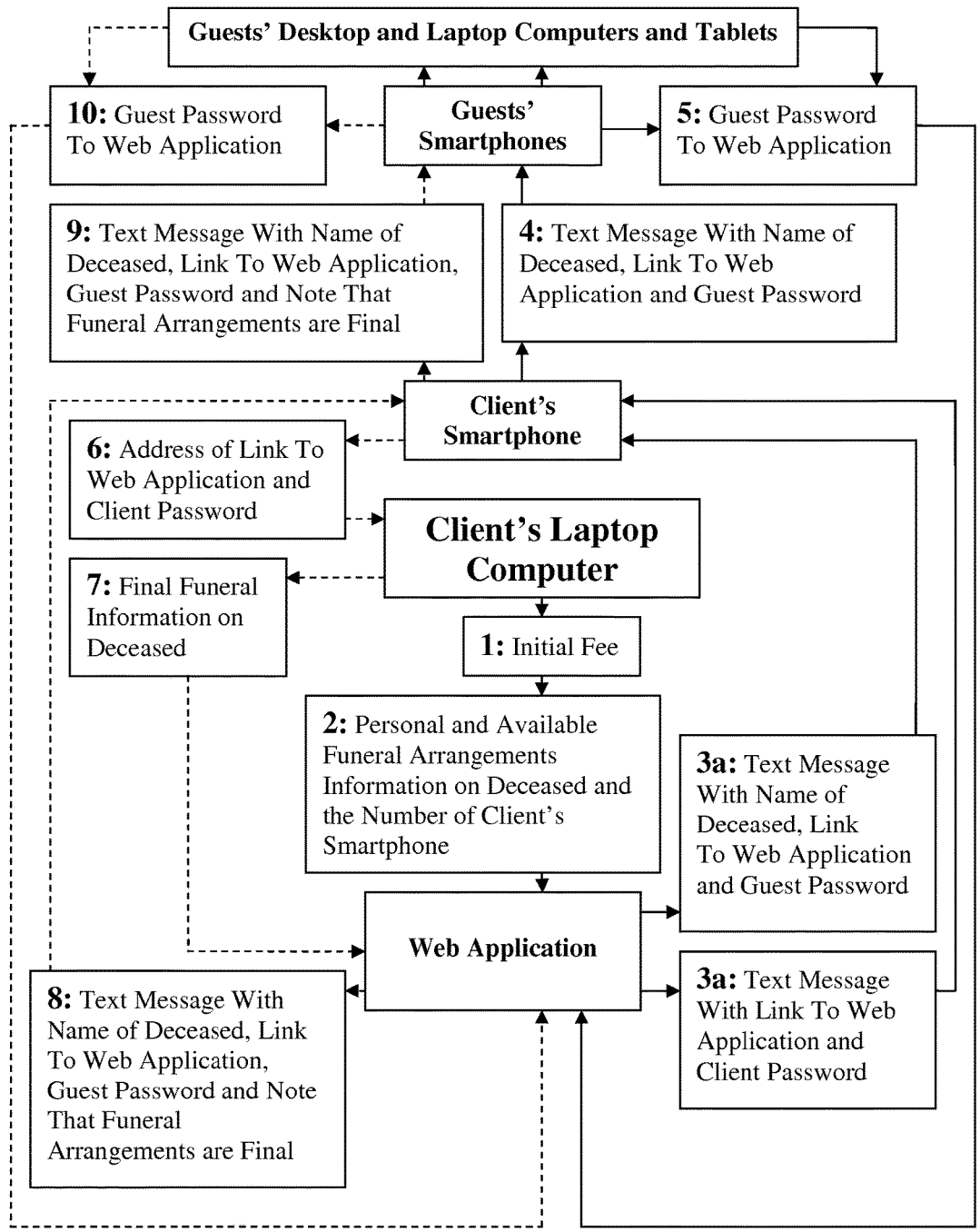
FIG. 5 is a Flowchart of a fifth version of the process of dispensing and receiving notification by text messages over smartphones about the deaths and information on funeral arrangements of people wherein the client uses a combination of a smartphone and laptop computer and the guests, a combination of smartphones, desktop and laptop computers and tablets to access the information.

Referring to FIG. 5, therein is shown a fifth version of the process comprising of the following actions: 1: Using a laptop computer, the client accesses the application and pays a fee. 2: Still using the laptop computer, the client then enters personal and available funeral arrangements information on the deceased and the number of a smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. Some of the guests may choose to use the link together with the guest password and their smartphones to access information on funeral arrangements. Other guests may choose to use the address of link together with the guest password and either their desktop or laptop computers or tablets to access information on funeral arrangements. 6: If funeral arrangements were incomplete or have changed, the client uses the address of the link together with the client password and the laptop computer to access the application. 7: Information on funeral arrangements is updated using the laptop computer. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: Some of the guests may choose to use the link together with the guest password and their smartphones to access information on final funeral arrangements. Other guests may choose to use the address of link together with the guest password and either their desktop or laptop computers or tablets to access information on final funeral arrangements.

Figure 6:
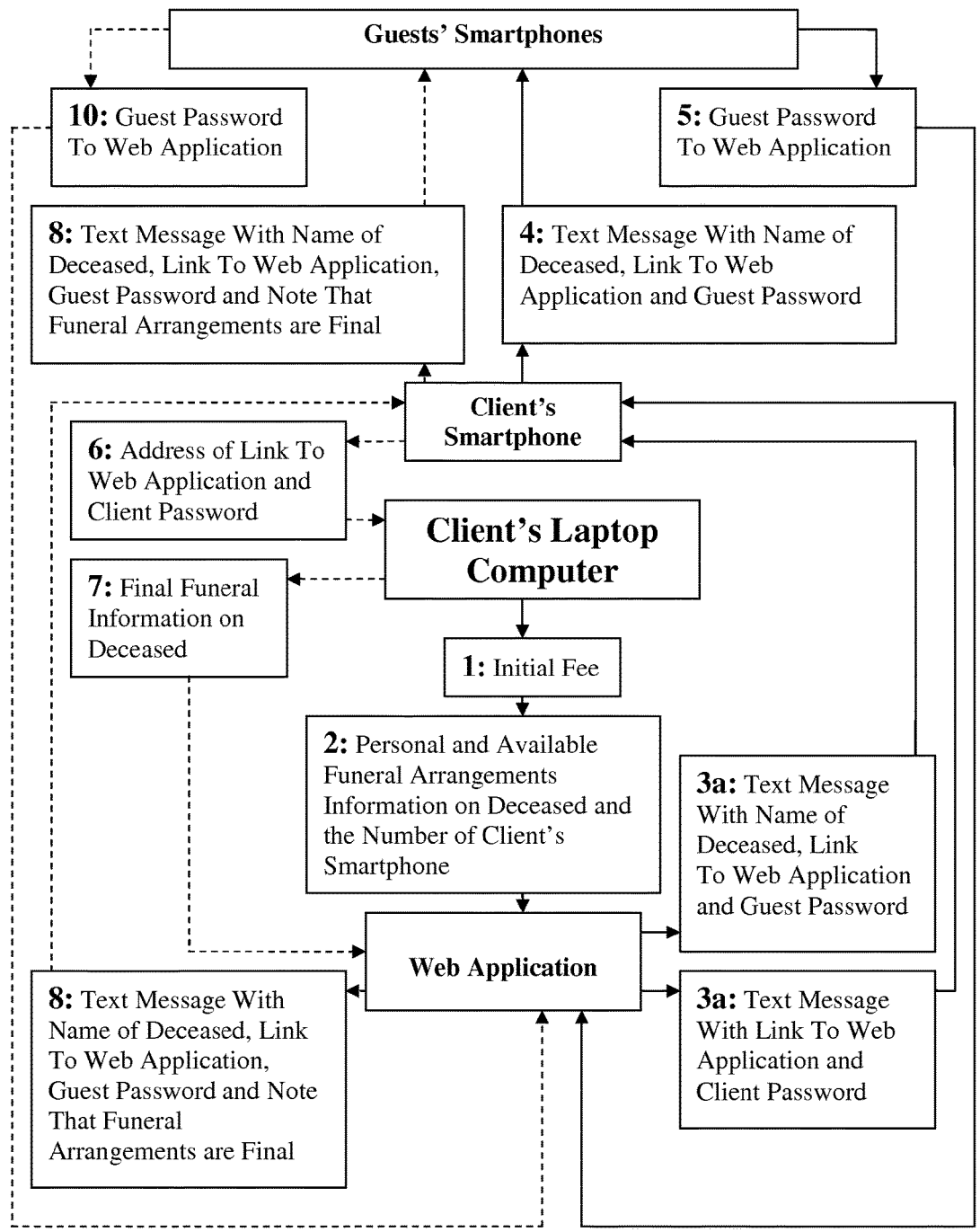
FIG. 6 is a Flowchart of a sixth version of the process of dispensing and receiving notification by text messages over smartphones about the deaths and information on funeral arrangements of people wherein the client uses a combination of a smartphone and laptop computer and the guests, smartphones to access the information.

Referring to FIG. 6, therein is shown a sixth version of the process comprising of the following actions: 1: Using a laptop computer, the client accesses the application and pays a fee. 2: Still using the laptop computer, the client then enters personal and available funeral arrangements information on the deceased and the number of a smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. The guests will use the link together with the guest password and their smartphones to access information on funeral arrangements. 6: If funeral arrangements were incomplete or have changed, the client uses the address of the link together with the client password and the desktop computer to access the application. 7: Information on funeral arrangements is updated using the laptop computer. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: The guests will use the link together with the guest password and their smartphones to access information on final funeral arrangements.

Figure 7:
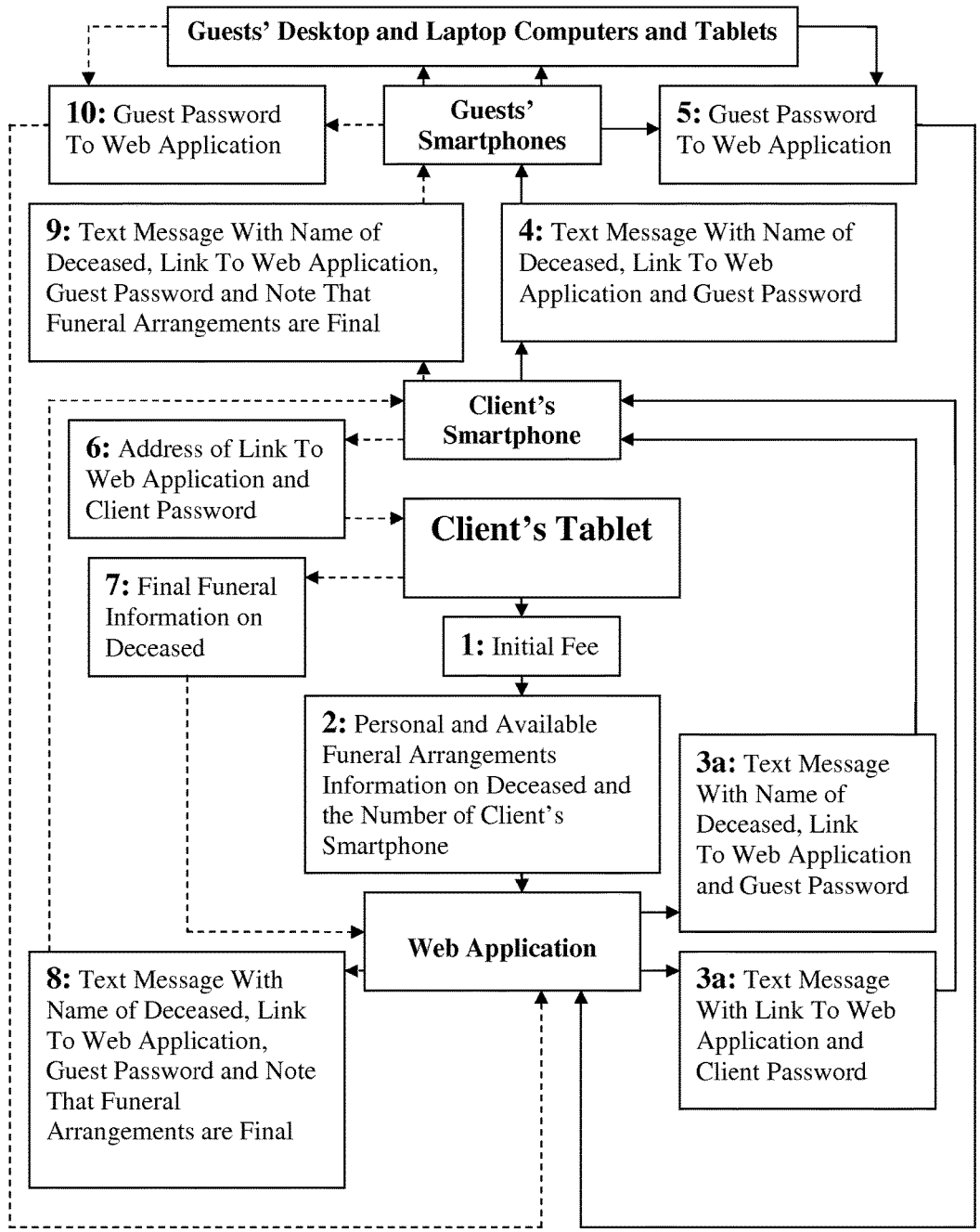
FIG. 7 is a Flowchart of a seventh version of the process of dispensing and receiving notification by text messages over smartphones about the deaths and information on funeral arrangements of people wherein the client uses a combination of a smartphone and tablet and the guests, a combination of smartphones, desktop and laptop computers and tablets to access the information.

Referring to FIG. 7, therein is shown a seventh version of the process comprising of the following actions: 1: Using a tablet, the client accesses the application and pays a fee. 2: Still using the tablet, the client then enters personal and available funeral arrangements information on the deceased and the number of a smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. Some of the guests may choose to use the link together with the guest password and their smartphones to access information on funeral arrangements. Other guests may choose to use the address of link together with the guest password and either their desktop or laptop computers or tablets to access information on funeral arrangements. 6: If funeral arrangements were incomplete or have changed, the client uses the address of the link together with the client password and the tablet to access the application. 7: Information on funeral arrangements is updated using the tablet. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: Some of the guests may choose to use the link together with the guest password and their smartphones to access information on final funeral arrangements. Other guests may choose to use the address of link together with the guest password and either their desktop or laptop computers or tablets to access information on final funeral arrangements.

Figure 8:
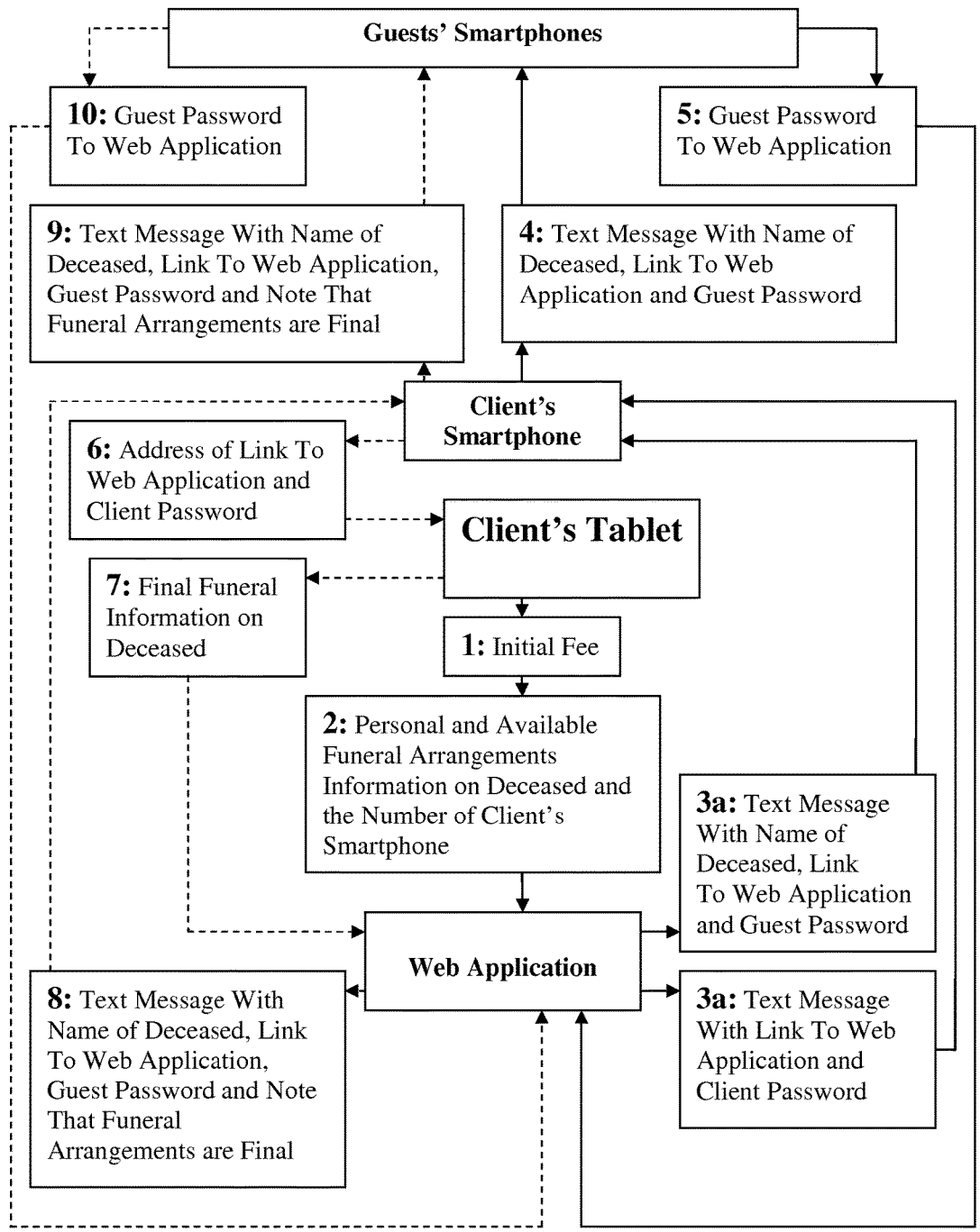
FIG. 8 is a Flowchart of an eight version of the process of dispensing and receiving notification by text messages over smartphones about the deaths and information on funeral arrangements of people wherein the client uses a combination of a smartphone and tablet and the guests, smartphones to access the information.

Referring to FIG. 8, therein is shown an eight version of the process comprising of the following actions: 1: Using a tablet, the client accesses the application and pays a fee. 2: Still using the tablet, the client then enters personal and available funeral arrangements information on the deceased and the number of a smartphone in a web page of the web application. 3a and 3b: On closing the web page, two text messages are generated and sent to the client's smartphone. One text message contains a link to the web application together with a client password which allows access to the specific record of the deceased in the web application to update information on funeral arrangements. The second text message contains the name of the deceased, a link to the web application together with a guest password which allows to be displayed the specific record of the deceased in the web application and a note requesting the text message be forwarded to the relevant contacts in the forwarded contacts' smartphones. Whereas, the link in the first text message takes the client to the Home Page of the application, the link in the second text message takes the guests to the web page where personal and funeral arrangements information are available. 4: The text message, containing the name of the deceased and a link to the web application together with a guest password which allows to be displayed the specific record of the deceased in the web application and a note requesting the text message be forwarded to the relevant contacts in the forwarded contacts' smartphones, is forwarded to the relevant contacts in the client's smartphone. The word 'guests' is used collectively to describe all the relevant contacts to whom text messages are forwarded. 5: Access to the application is free for all guests. The guests will use the link together with the guest password and their smartphones to access information on funeral arrangements. 6: If funeral arrangements were incomplete or have changed, the client uses the address of the link together with the client password and the tablet to access the application. 7: Information on funeral arrangements is updated using the tablet. 8: On closing the web page, a text message is generated and sent to the client's smartphone. The new text message contains the name of the deceased, the link to the web application, the guest password, a note stating that funeral arrangements have been updated and a second note requesting the text message be forwarded to the relevant contacts in the forwarded contacts' smartphones. 9: The new text message is forwarded to the relevant contacts in the client's smartphone. 10: The guests will use the link together with the guest password and their smartphones to access information on final funeral arrangements.

What is claimed is:

1. A process of dispensing and receiving notification by text messages over smartphones, the messages being about the deaths and information on funeral arrangements of people, the process comprising:
    a. displaying, by a web application stored in non-transitory computer readable medium, a web page with user entries, the entries comprising: (i) personal and available funeral arrangements of a deceased person, hereinafter "the deceased", (ii) a number of a client smartphone, wherein the web page is available in a plurality of languages;
    b. upon a user closing said web page, sending, by the web application, a first text message and a second text message to said number of said client smartphone, wherein
    c. the first text message contains: (i) a name of the deceased, (ii) a link to said web page, (iii) a client password, wherein the client password is required for updating a record of the deceased in said web page, and wherein
    d. the second text message contains: (i) the name of the deceased, (ii) a link to said web page, (iii) a guest password, wherein the guest password is required for displaying the record of the deceased in said web page, and (iv) a first note requesting said text message be forwarded to relevant contacts in a recipients' contacts;
    e. forwarding, by the web application, the second text message to one or more contacts in said client smartphone;
    f. upon closing said web page after the client password is used to update funeral arrangements, sending, by the web application, to said number of the client smartphone, a third text message, the third text message containing: (i) the name of the deceased, (ii) said link to said web application, (iii) said guest password, (iv) a second note stating that information on funeral arrangements is final, and (v) a third note requesting said text message be forwarded to the relevant contacts in the recipient's contacts.

2. The process of dispensing and receiving notification by text messages over smartphones about the deaths and information on funeral arrangements of people of claim 1 whereby the language of communication is that of the client.

3. The process of dispensing and receiving notification by text messages over smartphones about the deaths and information on funeral arrangements of people of claim 1 whereby available information on the deaths and funeral arrangements is dispensed by entering it with a smartphone.

4. The process of dispensing and receiving notification by text messages over smartphones about the deaths and information on funeral arrangements of people of claim 1 whereby available information on the deaths and funeral arrangements can also be dispensed by entering it with a desktop computer or a laptop computer or a tablet.

5. The process of dispensing and receiving notification by text messages over smartphones about the deaths and information on funeral arrangements of people of claim 1 whereby updated information on funeral arrangements is dispensed by entering it with a smartphone, using said link and said password in said text message.

6. The process of dispensing and receiving notification by text messages over smartphones about the deaths and information on funeral arrangements of people of claim 1 whereby updated information on funeral arrangements can also be dispensed by entering it with a desktop computer or a laptop computer or a tablet, using the address of said link and said password in said text message.

7. The process of dispensing and receiving notification by text messages over smartphones about the deaths and information on funeral arrangements of people of claim 1 whereby information on the deaths and funeral arrangements can be displayed by using smartphones, using said link and said password in said text message.

8. The process of dispensing and receiving notification by text messages over smartphones about the deaths and information on funeral arrangements of people of claim 1 whereby information on the deaths and funeral arrangements can also be displayed by using desktop computers or laptop computers or tablets, using said address of said link and said password in said text message.

* * * * *